United States Patent
Nagata et al.

(10) Patent No.: US 9,859,547 B2
(45) Date of Patent: Jan. 2, 2018

(54) CURRENT INTERRUPTING DEVICE OF SEALED BATTERY

(71) Applicants: Hiroshi Nagata, Toyota (JP); Shigeru Takashiro, Toyota (JP)

(72) Inventors: Hiroshi Nagata, Toyota (JP); Shigeru Takashiro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 960 days.

(21) Appl. No.: 14/043,070

(22) Filed: Oct. 1, 2013

(65) Prior Publication Data

US 2014/0113163 A1    Apr. 24, 2014

(30) Foreign Application Priority Data

Oct. 19, 2012  (JP) ................................. 2012-232191

(51) Int. Cl.
| | |
|---|---|
| *H01M 14/00* | (2006.01) |
| *H01M 2/34* | (2006.01) |
| *H01M 10/0525* | (2010.01) |
| *H01M 2/08* | (2006.01) |
| *H01M 2/22* | (2006.01) |
| *H01M 2/26* | (2006.01) |

(52) U.S. Cl.
CPC .............. *H01M 2/345* (2013.01); *H01M 2/08* (2013.01); *H01M 2/22* (2013.01); *H01M 2/263* (2013.01); *H01M 10/0525* (2013.01); *H01M 2200/20* (2013.01)

(58) Field of Classification Search
CPC .......... H01M 2/345; H01M 2/22; H01M 2/08; H01M 2/263; H01M 10/0525; H01M 2200/20
See application file for complete search history.

(56) References Cited

U.S. PATENT DOCUMENTS

| 6,555,263 B1 | 4/2003 | Kim et al. |
|---|---|---|
| 2008/0038628 A1* | 2/2008 | Yamauchi ............... H01M 2/12 429/56 |
| 2010/0233529 A1* | 9/2010 | Nansaka ............... H01M 2/021 429/181 |
| 2013/0196220 A1 | 8/2013 | Okutani et al. |

FOREIGN PATENT DOCUMENTS

| CN | 1309431 A | 8/2001 |
|---|---|---|
| CN | 101834306 A | 9/2010 |
| JP | A-2010-212034 | 9/2010 |
| JP | A-2012-38529 | 2/2012 |
| JP | A-2013-175428 | 9/2013 |

* cited by examiner

*Primary Examiner* — Raymond Alejandro
(74) *Attorney, Agent, or Firm* — Oliff PLC

(57) ABSTRACT

A current interrupting device of a sealed battery includes a conductive member that is electrically connected to an external terminal of a battery case; a collector terminal that is arranged inside the battery case; and a reversing plate that is interposed between the conductive member and the collector terminal, and that electrically cuts off the conductive member from the collector terminal by deforming in response to an increase in pressure inside the battery case. An inner peripheral surface of the conductive member is joined to an outer peripheral surface of the reversing plate. An upper surface of the reversing plate does not contact the conductive member regardless of an activation of the current interrupting device.

3 Claims, 6 Drawing Sheets

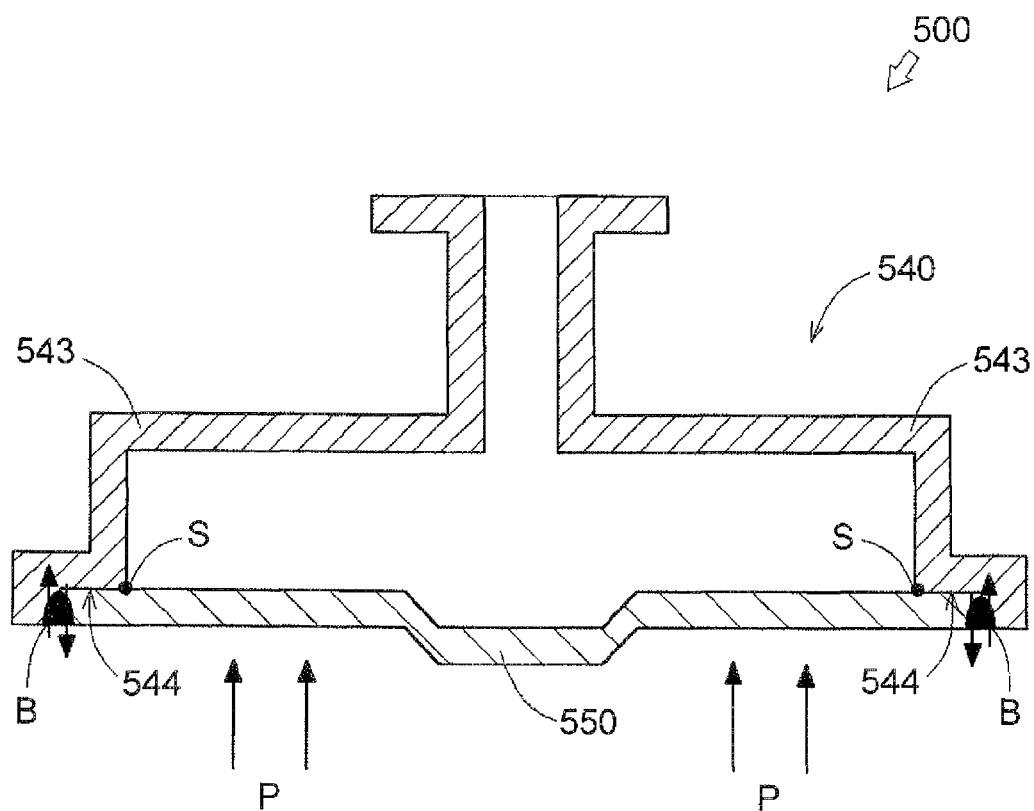

CURRENT INTERRUPTING DEVICE OF SEALED BATTERY

INCORPORATION BY REFERENCE

The disclosure of Japanese Patent Application No. 2012-232191 filed on Oct. 19, 2012 including the specification, drawings and abstract is incorporated herein, by reference in its entirety.

BACKGROUND OF THE INVENTION

1. Field of the Invention

The invention relates to technology of a current interrupting device of a sealed battery.

2. Description of Related Art

A sealed battery is a battery configured with an electrode body that includes a positive electrode and a negative electrode being sealed, together with an electrolyte, inside a battery case. A lithium-ion secondary battery is one well-known example of a sealed battery. Some sealed batteries are provided with a current interrupting device that detects overcharge and interrupts current. One such known current interrupting device is a pressure-type current interrupting device that physically interrupts current when the internal pressure of the battery case becomes higher than a set pressure (for example, Japanese Patent Application Publication No. 2010-212034 (JP 2010-212034 A)).

A related pressure-type current interrupting device such as that described in JP 2010-212034 A includes a conductive member that is electrically connected to an external terminal of a battery case, a collector terminal that is arranged inside the battery case, and a reversing plate that is interposed between the conductive member and the collector terminal. The conductive member is formed in a recessed shape that is recessed upward, and the entire circumference of the reversing plate is joined to a bottom portion of the conductive member by welding.

Problems with a related pressure-type current interrupting device 500 will now be described with reference to FIG. 6. FIG. 6 is a view showing a frame format of the related pressure-type current interrupting device 500.

First, the structure of the pressure-type current interrupting device 500 will be described. The pressure-type current interrupting device 500 is designed to electrically cut off a rivet 540 that serves as a conductive member from a collector terminal, not shown. The pressure-type current interrupting device 500 includes the rivet 540 and a reversing plate 550.

A recessed portion 543 of the rivet 540 is formed in a recessed shape that is recessed upward. A receiving portion 544 is formed on an inside surface of a lower end portion of the recessed portion 543. The reversing plate 550 is formed in a discoid shape. The entire circumference of an edge portion of the reversing plate 550 is joined by welding to an inner peripheral surface of the receiving portion 544 of the rivet 540.

Now the operation and problems of the pressure-type current interrupting device 500 will be described. If the pressure inside the battery case becomes higher than a set pressure due to some sort of abnormality, internal pressure P is applied to the reversing plate 550, causing the reversing plate 550 to deform in such a way that it bends upward.

When the internal pressure P is applied to the reversing plate 550 causing the reversing plate 550 to deform at this time, shearing stress consequently acts on a weld B via a fulcrum of leverage S. If the shearing stress applied to the weld B is greater than a predetermined stress value, the weld B may fracture. Therefore, in a pressure-type current interrupting device of a sealed battery, there is a need to reduce the shearing stress that is applied to the reversing plate when the pressure-type current interrupting device is activated.

SUMMARY OF THE INVENTION

The invention thus provides a current interrupting device of a sealed battery capable of reducing shearing stress applied to a reversing plate when the current interrupting device is activated.

A first aspect of the invention relates to a current interrupting device of a sealed battery, that includes a conductive member that is electrically connected to an external terminal of a battery case; a collector terminal that is arranged inside the battery case; and a reversing plate that is interposed between the conductive member and the collector terminal. The current interrupting device electrically cuts off the conductive member from the collector terminal by the reversing plate deforming in response to an increase in pressure inside the battery case. An inner peripheral surface of the conductive member is joined to an outer peripheral surface of the reversing plate, and an upper surface of the reversing plate does not contact the conductive member regardless of an activation of the current interrupting device.

The conductive member may be formed in a recessed shape that is recessed upward, and the entire outer peripheral surface of the reversing plate may be joined to an inner peripheral surface of a bottom portion of the conductive member by welding.

A second aspect of the invention relates to a current interrupting device of a sealed battery, that includes a conductive member that is electrically connected to an external terminal of a battery case; a collector terminal that is arranged inside the battery case; and a reversing plate that is interposed between the conductive member and the collector terminal, and that electrically cuts off the conductive member from the collector terminal by deforming in response to an increase in pressure inside the battery case. The conductive member includes a small diameter portion that is a generally cylindrical portion, a recessed portion provided below the small diameter portion, and a flange portion that extends from an outer periphery of a lower portion of the recessed portion. The reversing plate is joined to a cylindrical wall portion of the recessed portion.

A third aspect of the invention relates to a current interrupting device of a sealed battery, that includes a conductive member that is electrically connected to an external terminal of a battery case; a collector terminal that is arranged inside the battery case; and a reversing plate that is interposed between the conductive member and the collector terminal, and that electrically cuts off the conductive member from the collector terminal by deforming in response to an increase in pressure inside the battery case. The conductive member includes a small diameter portion that is a generally cylindrical portion, a recessed portion provided below the small diameter portion, and an extended portion that extends inward of the recessed portion from an outer periphery of a lower portion of the recessed portion. The conductive member is joined to the reversing plate.

According to the current interrupting device of a sealed battery of the invention, shearing stress that acts on the reversing plate when the current interrupting device is activated is able to be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a view showing a frame format of a rivet and a reversing plate according to related art.

DETAILED DESCRIPTION OF EMBODIMENTS

Figure 1:
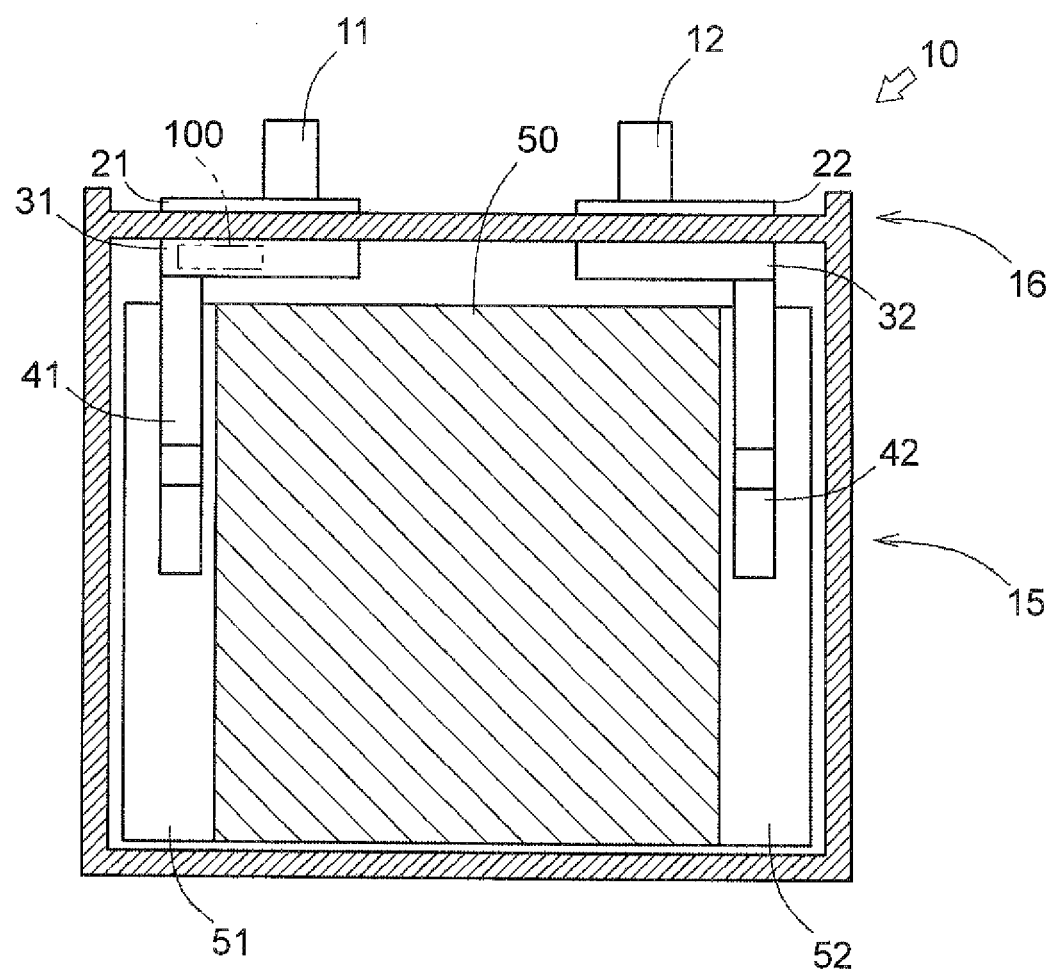
FIG. 1 is a view showing a frame format of a lithium-ion battery.

A lithium-ion secondary battery 10 will now be described with reference to FIG. 1. FIG. 1 is a sectional view showing a frame format of the lithium-ion secondary battery 10.

The lithium-ion secondary battery 10 is one example embodiment of the sealed battery of the invention. The lithium-ion secondary battery 10 includes a battery case 15, a lid 16, a positive terminal 11 as an external terminal, a negative terminal 12 as an external terminal, and a rolled electrode body 50 as a collector.

The battery case 15 is configured as a cuboid-shaped square case. The flat rolled electrode body 50 and an electrolyte are housed inside the battery case 15. The lid 16 is configured to block off an open portion that is open in an upper portion of the battery case 15. The positive terminal 11 and the negative terminal 12 that are for external connection are provided on the lid 16. A portion of both the positive terminal 11 and the negative terminal 12 protrudes on the surface side of the lid 16.

A positive collector 51 is exposed on an end portion on one side, in a width direction, of the rolled electrode body 50 that serves as a collector. Meanwhile, a negative collector 52 is exposed on an end portion on the other side, in the width direction, of the rolled electrode body 50 that serves as a collector.

A leg portion 41 of a positive collector plate 31 is joined to the positive collector 51. Meanwhile, a leg portion 42 of a negative collector plate 32 is joined to the negative collector 52. The positive collector plate 31 electrically connects the positive collector 51 of the rolled electrode body 50 to the positive terminal 11, and is also used as a constituent member of a pressure-type current interrupting device 100. The negative collector plate 32 electrically connects the negative collector 52 of the rolled electrode body 50 to the negative terminal 12.

The positive terminal 11 that serves as an external terminal is electrically connected to the positive collector 51 of the rolled electrode body 50 via a Z terminal 21, the pressure-type current interrupting device 100, and the positive collector plate 31. The negative terminal 12 that serves as an external terminal is electrically connected to the negative collector 52 of the rolled electrode body 50 via a Z terminal 22 and the negative collector plate 32.

Figure 2:
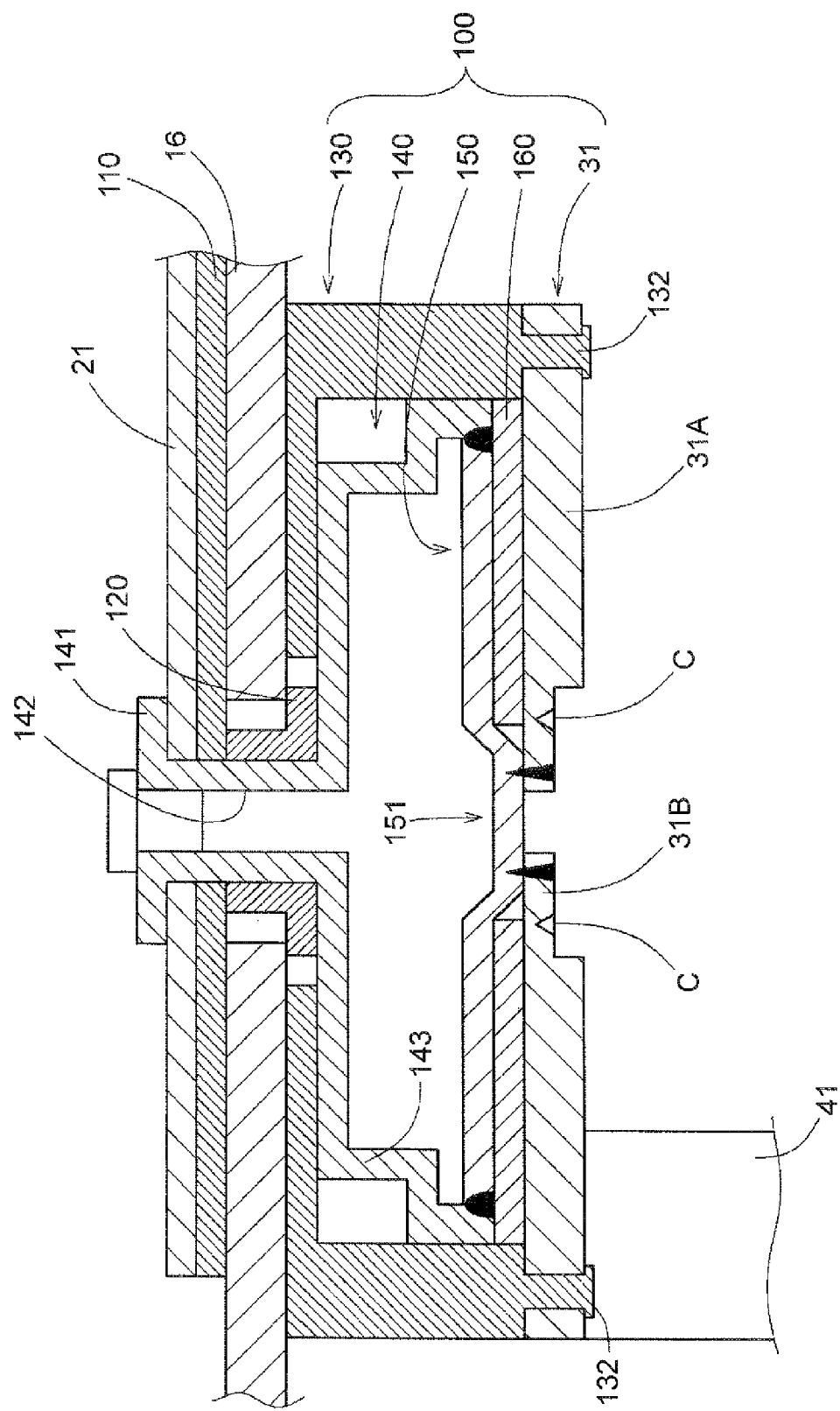
FIG. 2 is a view showing a frame format of a current interrupting device.

The structure of the pressure-type current interrupting device 100 that is one example embodiment of the pressure-type current interrupting device of the invention will now be described with reference to FIG. 2. FIG. 2 is a sectional view showing a frame format of the pressure-type current interrupting device 100.

The pressure-type current interrupting device 100 is a device that interrupts the flow of current when pressure within the battery case 15 of the lithium-ion secondary battery 10 becomes higher than a set pressure. In this example embodiment, the pressure-type current interrupting device 100 is provided on the positive electrode side of the lithium-ion secondary battery 10, but it may also be provided on the negative electrode side.

The pressure-type current interrupting device 100 includes an insulating plate 130, a rivet 140 that serves as a conductive member, a reversing plate 150, a seal member 160, and the positive collector plate 31.

The rivet 140 as the conductive member is made of copper, and has a small diameter portion 142 that is a generally cylindrical portion, and a recessed portion 143 that has a recessed shape that is recessed upward. The rivet 140 has three functions, the first of which is to tightly fix the lid 16 and the like, the second of which is to electrically connect the Z terminal 21 to the positive collector plate 31, and the third of which is to form a space for the reversing plate 150 to reverse.

With the small diameter portion 142 of the rivet 140, the Z terminal 21, an upper gasket 110, a lower gasket. 120, the lid 16, and the insulating plate 130 are all tightly fixed between an upper end edge portion 141 and the recessed portion 143. The space for the reversing plate 150 to reverse is formed inside of the recessed portion 143 of the rivet 140. The reversing plate 150 is fixed by welding to a lower end portion of the recessed portion 143 of the rivet 140.

The Z terminal 21 is made of copper, and electrically connects the positive terminal 11 (see FIG. 1) to the rivet 140. An open portion is formed in the Z terminal 21, and the rivet 140 is inserted through this open portion.

The upper gasket 110 is made of resin, and insulates the Z terminal 21 from the lid 16. An open portion is formed in the upper gasket 110, and the rivet 140 is inserted through this open portion.

The lid 16 is made of aluminum, and blocks off the open portion that is open in the upper portion of the battery case 15, as described above (see FIG. 1). An open portion is formed in the lid 16, and the rivet 140 is inserted through this open portion.

The lower gasket 120 is made of resin, and insulates the rivet 140 from the lid 16, just like the insulating plate 130 that will be described later. The lower gasket 120 is arranged between the lid 16 and the rivet 140.

The insulating plate 130 is made of resin, and insulates the rivet 140 from the lid 16. The insulating plate 130 is interposed between the rivet 140 and the lid 16.

The reversing plate 150 is made of copper, and is formed in a discoid shape. A recessed portion 151 that is a portion in which the upper side is recessed, is formed in generally the center portion of the reversing plate 150. An edge portion around the reversing plate 150 is joined to a lower end portion of the recessed portion 143 of the rivet 140 by welding. The joint between the reversing plate 150 and the rivet 140 is welded all around.

The seal member 160 is made of rubber, and is formed in a generally discoid shape with a hole formed in substantially the center portion. The seal member 160 is arranged compressed between the reversing plate 150 and the positive collector plate 31.

The positive collector plate 31 is made of copper, and electrically connects the positive collector 51 of the rolled electrode body 50 to the reversing plate 150. The positive collector plate 31 includes a main body 31A, a connecting portion 31B, and a leg portion 41.

The main body 31A is formed in a discoid shape, and is tightly fixed on both sides thereof to leg portions 132 of the insulating plate 130.

The connecting portion 31B is a portion on an inner peripheral side of a slit C formed in a circular shape that is formed in generally the center portion of the main body 31A. The thickness of the connecting portion 31B and the portion of the main body 31A in which the slit C is formed, is formed thinner than the thickness of any other portion of the main body 31A. A hole is formed in the center portion of the connecting portion 31B. The connecting portion 31B is joined by welding to the reversing plate 150.

The leg portion 41 extends downward from the main body 31A, and is joined to the positive collector 51 of the rolled electrode body 50 by welding.

The state of the pressure-type current interrupting device 100 shown in FIG. 2 is the state during normal operation (i.e., a state in which the pressure-type current interrupting device 100 is not activated), with the positive terminal 11, the Z terminal 21, the rivet 140, the reversing plate 150, and the positive collector plate 31 electrically connected together.

However, when the pressure inside the battery case 15 becomes higher than a set pressure, pressure is applied from the inside to the recessed portion 151 of the reversing plate 150 that is connected to the connecting portion 31B of the positive collector plate 31, and as a result, the portion of the positive collector plate 31 with the slit C fractures and the reversing plate 150 deforms outward. That is, the pressure-type current interrupting device 100 activates. As a result, the positive collector plate 31 becomes electrically cut off (i.e., disconnected) from the reversing plate 150.

Figure 3:
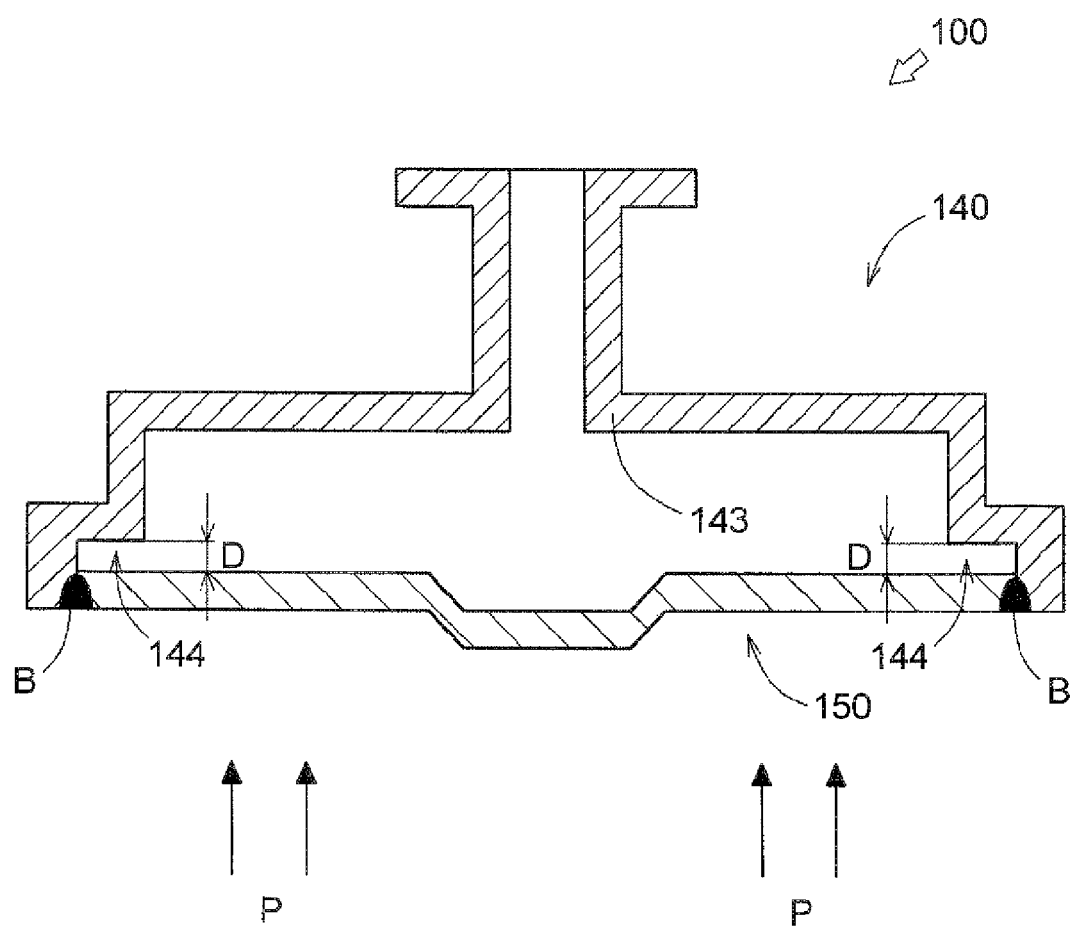
FIG. 3 is a view showing a frame format of a rivet and a reversing plate according to a first example embodiment of the invention.

Next, the pressure-type current interrupting device 100 will be described in further detail with reference to FIG. 3. To facilitate understanding of the description, FIG. 3 is a sectional view showing a frame format of the rivet 140 and the reversing plate 150 of the pressure-type current interrupting device 100.

First, the structures of the rivet 140 and the reversing plate 150 will be described. The recessed portion 143 of the rivet 140 is formed in a recessed shape that is recessed upward, as described above. A receiving portion 144 is formed on an inside surface of a lower end portion of the recessed portion 143. The reversing plate 150 is formed in a discoid shape. The entire circumference of the edge portion of the reversing plate 150 is joined by welding to the receiving portion 144 of the rivet 140.

More specifically, the receiving portion 144 of the rivet 140 is formed in a shape in which the inner peripheral side of the lower end portion (i.e., the bottom portion) of the recessed portion 143 is cut out in a recessed shape, such that the receiving portion 144 of the rivet 140 has an inner peripheral surface and a lower surface that extends to the inner peripheral side from the upper end of this inner peripheral surface. Also, at a weld between the rivet 140 and the reversing plate 150, only the outer peripheral surface of the reversing plate 150 is abutted against and joined to the receiving portion 144 along the entire periphery.

That is, at the joint between the receiving portion 144 and the reversing plate 150, the inner peripheral surface of the receiving portion 144 and the outer peripheral surface of the reversing plate 150 are joined together only by welding. A predetermined gap D is formed between the lower surface of the receiving portion 144 and the upper surface of the reversing plate 150, so the lower surface of the receiving portion 144 is not abutting against the upper surface of the reversing plate 150.

The predetermined gap D is large enough so that the upper surface of the reversing plate 150 will not contact the lower surface of the receiving portion 144 even if the pressure-type current interrupting device 100 activates and the reversing plate 150 deforms by bending upward.

Next, the operation of the pressure-type current interrupting device 100 (i.e., the rivet 140 and the reversing plate 150) will be described. As described above, if the pressure inside the battery case becomes higher than a set pressure due to some sort of abnormality, internal pressure P will be applied to the reversing plate 150, causing the reversing plate 150 to deform by bending upward.

Even if the internal pressure P is applied to the reversing plate 150 at this time, shearing stress will not be applied to the weld B via the fulcrum of leverage because the predetermined gap D is formed between the upper surface of the reversing plate 150 and the lower surface of the receiving portion 144.

That is, with the related pressure-type current interrupting device, if the reversing plate 550 deforms by bending upward when the upper surface of the reversing plate 550 is abutting against the lower surface of the receiving portion 544, the inner peripheral side end of the lower surface of the receiving portion 544 will become the fulcrum of leverage S, and a large shearing stress will be applied to the weld B between the reversing plate 550 and the receiving portion 544.

With the pressure-type current interrupting device 100 according to this example embodiment, the predetermined gap D is formed between the upper surface of the reversing plate 150 and the lower surface of the receiving portion 144, so the upper surface of the reversing plate 150 does not contact the lower surface of the receiving portion 144. Therefore, the inner peripheral side end of the lower surface of the receiving portion 144 will not become a fulcrum of leverage, so a large shearing stress will not be applied to the weld between the reversing plate 150 and the receiving portion 144.

Now the effects of the pressure-type current interrupting device 100 will be described. The pressure-type current interrupting device 100 is able to reduce the shearing stress that is applied to the reversing plate 150 when the pressure-type current interrupting device is activated.

Figure 4:
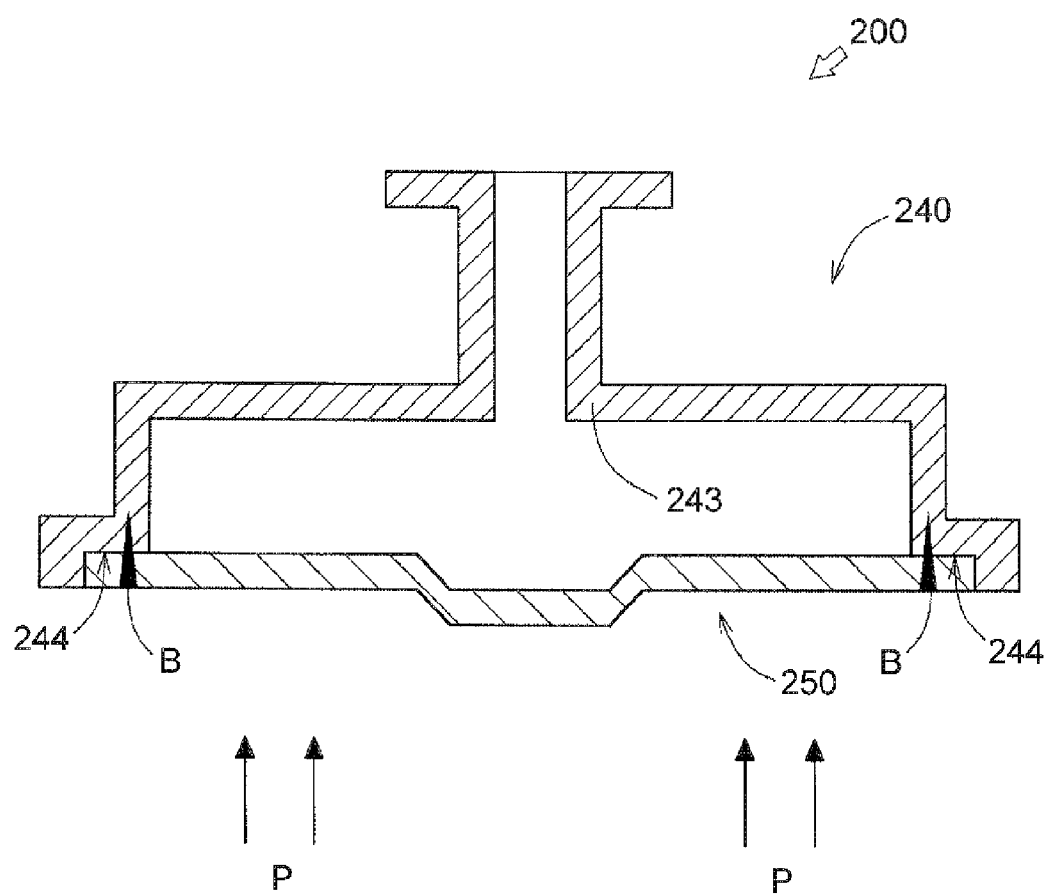
FIG. 4 is a view showing a frame format of a rivet and a reversing plate according to a second example embodiment of the invention.

Next, a pressure-type current interrupting device 200 that is a second example embodiment of the pressure-type current interrupting device of the invention will be described with reference to FIG. 4. To facilitate understanding of the description, FIG. 4 is a sectional view showing a frame format of a rivet 240 and the reversing plate 250 of the pressure-type current interrupting device 200.

The structure of the pressure-type current interrupting device 200 other than the rivet 240 and the reversing plate 250 is the same as that of the pressure-type current interrupting device 100, so a description thereof will be omitted.

Now the structure of the rivet 240 and the reversing plate 250 will be described. A recessed portion 243 of the rivet 240 is formed in a recessed shape that is recessed upward. A receiving portion 244 is formed on an inside surface of a lower end portion of the recessed portion 243. The reversing plate 250 is formed in a discoid shape. The entire circumference of an edge portion of the reversing plate 250 is joined by welding to the receiving portion 244 of the rivet 240.

More specifically, the receiving portion 244 of the rivet 240 is formed in a shape in which the inner peripheral side of the lower end portion of the recessed portion 243 is cut out in a recessed shape, such that the receiving portion 244 of the rivet 240 has an inner peripheral surface and a lower surface that extends to the inner peripheral side from the upper end of this inner peripheral surface. Also, at a weld between the rivet 240 and the reversing plate 250, the outer peripheral surface and the upper surface of the reversing plate 250 are joined in a state fitted to the inner peripheral surface and the lower surface of the receiving portion 244.

At this time, the welding method of the weld is lap welding. Lap welding is a keyhole welding method that involves emitting a laser beam from a direction (the overlapping direction of the reversing plate 250 and the rivet 240) substantially perpendicular to the surface (the lower surface in FIG. 4) of the reversing plate 250 in the overlapping direction.

Also, the width of fusion of the weld is made sufficiently smaller than the width of the portion where the upper surface of the reversing plate 250 abuts against the lower surface of the receiving portion 244. The reversing plate 250 is joined to a cylindrical wall portion of the recessed portion 243, which positions above the receiving portion 244.

Next, the effects of the pressure-type current interrupting device 200 will be described. Conventionally, when the width of the weld of the reversing plate 250 and the rivet 240 is large, contraction stress occurs at the weld. As a result, stress is applied to the reversing plate 250, which may cause the reversing plate 250 to deform.

According to the pressure-type current interrupting device 200 of this example embodiment, the heat input during welding is able to be reduced by decreasing the weld width with lap welding, thus making it possible to prevent contraction stress from occurring at the weld B. Accordingly, stress will not be applied to the reversing plate 250, so the reversing plate 250 will not deform.

Figure 5:
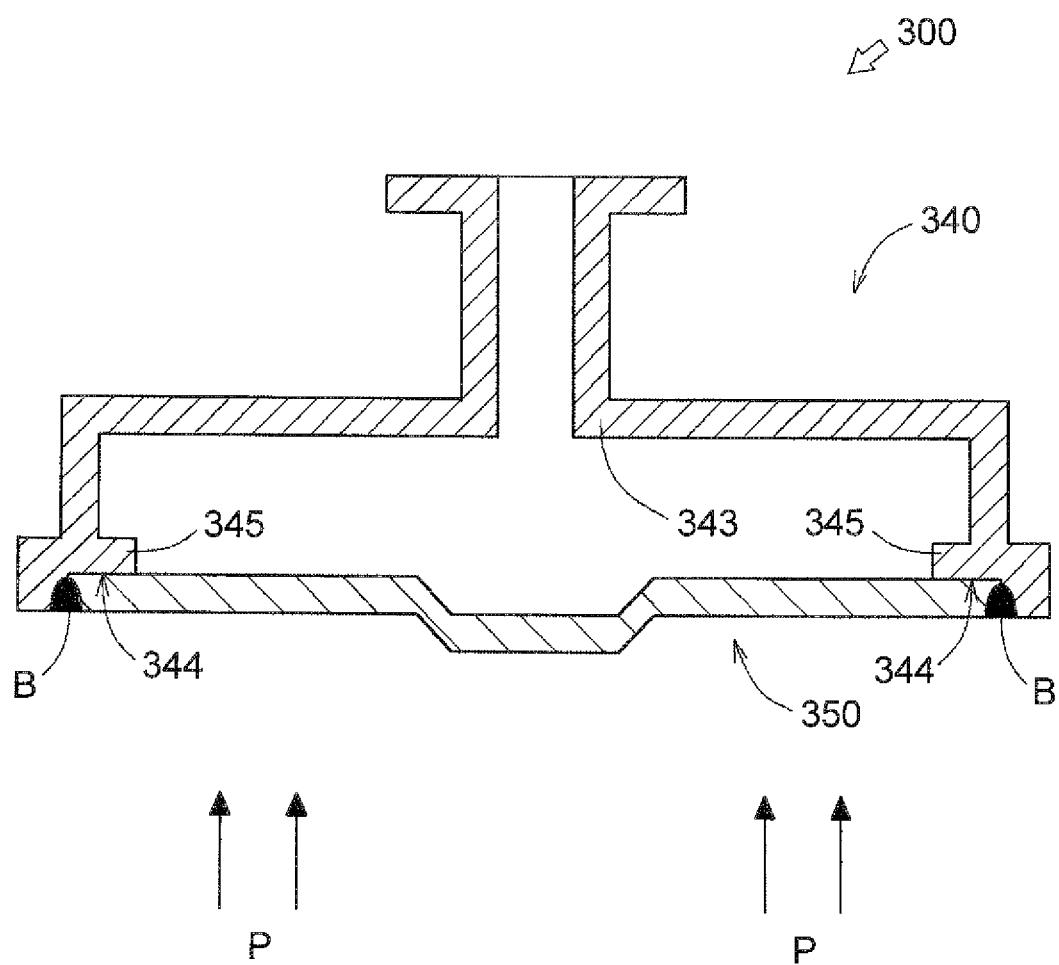
FIG. 5 is a view showing a frame format of a rivet and a reversing plate according to a third example embodiment of the invention.

Next, a pressure-type current interrupting device 300 that is a third example embodiment of the pressure-type current interrupting device of the invention will be described with reference to FIG. 5. To facilitate understanding of the description, FIG. 5 is a sectional view showing a frame format of a rivet 340 and the reversing plate 350 of the pressure-type current interrupting device 300.

The structure of the pressure-type current interrupting device 300 other than the rivet 340 and the reversing plate 350 is the same as that of the pressure-type current interrupting device 100, so a description thereof will be omitted.

Now the structure of the rivet 340 and the reversing plate 350 will be described. A recessed portion 343 of the rivet 340 is formed in a recessed shape that is recessed upward. A receiving portion 344 and an extended portion 345 are formed on an inside surface of a lower end portion of the recessed portion 343. A reversing plate 350 is formed in a discoid shape. The entire circumference of an edge portion of the reversing plate 350 is joined by welding to the receiving portion 344 of the rivet 340.

More specifically, the receiving portion 344 is formed in a shape in which the inner peripheral side of the lower end portion of the recessed portion 343 is cut out in a recessed shape, such that the receiving portion 344 has an inner peripheral surface and a lower surface that extends to the inner peripheral side from the upper end of this inner peripheral surface. Also, the extended portion 345 extends toward the inner peripheral side from the inner peripheral surface of the lower end portion of the recessed portion 343, and the lower surface of the extended portion 345 is formed flush with the lower surface of the receiving portion 344.

With the weld of the reversing plate 350 and the rivet 340, the outer peripheral surface and the upper surface of the reversing plate 350 are fitted to and abutted against the inner peripheral surface and the lower surface of the receiving portion 344 as well as the lower surface of the extended portion 345, and the inner peripheral surface of the receiving portion 344 is joined to the outer peripheral surface of the reversing plate 350 by welding.

Next, the operation of the pressure-type current interrupting device 300 (i.e., the rivet 340 and the reversing plate 350) will be described. As described above, if the pressure inside the battery case becomes higher than a set pressure due to some sort of abnormality, internal pressure P will be applied to the reversing plate 350, causing the reversing plate 350 to deform by bending upward.

At this time, shearing stress is applied to the weld of the inner peripheral surface of the receiving portion 344 and the outer peripheral surface of the reversing plate 350, with the inner peripheral side end of the lower surface of the extended portion 345 being the fulcrum of leverage. However, because the extended portion 345 extends from the receiving portion 344, the fulcrum of leverage is offset farther to the inside than an inside edge of the upper surface of the receiving portion 344 from the weld, so even if internal pressure P is applied to the reversing plate 350, the shearing stress that is applied to the weld B via the fulcrum of leverage is able to be reduced.

Now the effect of the pressure-type current interrupting device 300 will be described. The pressure-type current interrupting device 300 enables shearing stress that is applied to the reversing plate 350 when the pressure-type current interrupting device 300 is activated to be reduced. Also, the extended portion 345 enables variation in the position of the fulcrum to be suppressed, and thus enables variation in the activation pressure of the reversing plate to be suppressed.

What is claimed is:

1. A current interrupting device of a sealed battery, comprising:
   a conductive member that is electrically connected to an external terminal of a battery case;
   a collector terminal that is arranged inside the battery case; and
   a reversing plate that is interposed between the conductive member and the collector terminal, and that electrically cuts off the conductive member from the collector terminal by deforming in response to an increase in pressure inside the battery case,
   wherein an inner peripheral surface of the conductive member is joined to an outer peripheral surface of the reversing plate, and
   an entire upper surface of the reversing plate does not contact the conductive member regardless of an activation of the current interrupting device.

2. The current interrupting device according to claim 1, wherein
   the conductive member is formed in a recessed shape that is recessed upward, and
   the entire outer peripheral surface of the reversing plate is joined to an inner peripheral surface of a bottom portion of the conductive member by welding.

3. The current interrupting device according to claim 1, wherein
   the conductive member comprises a diameter portion that is a generally cylindrical portion, a recessed portion provided below the diameter portion, and a flange portion that extends from an outer periphery of a lower portion of the recessed portion;

the reversing plate is provided a predetermined distance away from the flange portion; and a diameter of the diameter portion is smaller compared to the recessed portion.

\* \* \* \* \*